(12) United States Patent
Huang

(10) Patent No.: US 7,742,139 B2
(45) Date of Patent: Jun. 22, 2010

(54) ARRAY SUBSTRATE AND LIQUID CRYSTAL DISPLAY PANEL

(75) Inventor: Tien-Chun Huang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 690 days.

(21) Appl. No.: 11/566,750

(22) Filed: Dec. 5, 2006

(65) Prior Publication Data

US 2007/0279566 A1 Dec. 6, 2007

(30) Foreign Application Priority Data

Jun. 2, 2006 (TW) .............................. 95119728 A

(51) Int. Cl.
*G02F 1/1343* (2006.01)
(52) U.S. Cl. .................... 349/143; 349/38; 349/144
(58) Field of Classification Search ............... 349/38, 349/144
See application file for complete search history.

(56) References Cited

U.S. PATENT DOCUMENTS

| | | | |
|---|---|---|---|
| 5,396,354 A * | 3/1995 | Shimada et al. | 349/41 |
| 2006/0250533 A1* | 11/2006 | Shih | 349/38 |
| 2006/0279677 A1* | 12/2006 | Matsushima | 349/114 |
| 2007/0064164 A1* | 3/2007 | Tasaka et al. | 349/38 |
| 2007/0273803 A1* | 11/2007 | Liou et al. | 349/43 |

FOREIGN PATENT DOCUMENTS

| | | |
|---|---|---|
| CN | 1490645 | 4/2004 |
| CN | 1687836 | 10/2005 |
| JP | 07-043687 | 2/1995 |
| JP | 07-114020 | 5/1995 |
| JP | 07-270822 | 10/1995 |
| JP | 2006-119539 | 5/2006 |

OTHER PUBLICATIONS

English language translation of abstract of CN 1490645.
English language translation of abstract of CN 1687836.
English language translation of abstract and pertinent parts of JP 2006-119539 (published May 11, 2006).
English language translation of abstract and pertinent parts of JP 07-114020 (published May 2, 1995).
English language translation of abstract and pertinent parts of JP 07-043687 (published Feb. 14, 1995).
English language translation of abstract and pertinent parts of JP 07-270822 (published Oct. 20, 1995).

* cited by examiner

*Primary Examiner*—Uyen-Chau N Le
*Assistant Examiner*—Chris H Chu
(74) *Attorney, Agent, or Firm*—Thomas, Kayden, Horstemeyer & Risley

(57) ABSTRACT

Structures of array substrate and panel of LCD are provided. In the structures, a single pixel is divided into two sub-pixels. By altering thickness of passivation layer, dielectric layer or organic layer in the two sub-pixels, the total capacitances of the two sub-pixels are different. Therefore, the goal of increasing view angles of displays is achieved.

14 Claims, 3 Drawing Sheets

ARRAY SUBSTRATE AND LIQUID CRYSTAL DISPLAY PANEL

RELATED APPLICATIONS

The present application is based on, and claims priority from, Taiwan Application Serial Number 95119728, filed Jun. 2, 2006, the disclosure of which is hereby incorporated by reference herein in its entirety.

BACKGROUND

1. Field of Invention

The present invention relates to a liquid crystal display (LCD). More particularly, the present invention relates to an array substrate and a LCD panel, which increase the viewing angle of the LCD.

2. Description of Related Art

Recently, the progress of optoelectronic technology and the rapid development of digital technology push forward the expansion of LCD market. Because LCD has many advantages such as high display quality, small size, light weight, low driving voltage and low power consumption, LCD bas been widely applied to many electronics products such as PDAs, mobile phones, digital videos, notebooks, desk-top displays, digital cameras and projection TVs. Nowadays, LCD is gradually replacing traditional cathode ray tube (CRT) display and becoming the mainstream product in the display market.

there is a serious viewing angle problem in LCD. When voltage is applied to pixels of a LCD, all liquid crystal molecules in one of the pixels experience the same voltage and orient to the same orientation direction. Consequently, the display effect of LCD is varied by different viewing angle. When viewing a LCD at angles greater than a critical angle, the display color will be shifted, and the contrast of LCD will be decreased. Therefore, LCD can not provide uniform gray scale and the viewing angle is limited.

For the foregoing reasons, there is a need to obtain a LCD with wider viewing angle.

SUMMARY

It is therefore an aspect of the present invention to provide an array substrate and a panel of a LCD. The array substrate and the panel can reduce the problems of color shift and contrast ratio decrease when being viewed at high angles. Moreover, the array substrate and the panel can increase the viewing angle of the LCD.

In accordance with the foregoing and other aspects of the present invention, an array substrate of a LCD is provided. The array substrate comprises a first substrate, a lower electrode, a dielectric layer, an upper electrode, a passivation layer and two sub-pixel electrodes. The first substrate comprises a first sub-pixel region and a second sub-pixel region. A portion of the lower electrode is disposed in the first sub-pixel region, and the other portion of the lower electrode is disposed in the second sub-pixel region. The dielectric layer is disposed on the lower electrode and the first substrate. The upper electrode is disposed on the dielectric layer above the lower electrode. The passivation layer is disposed on the upper electrode and the dielectric layer. The passivation layer has an opening to expose the upper surface of the upper electrode. The thickness of the passivation layer in the first sub-pixel region is different from the thickness of the passivation layer in the second sub-pixel region. The two sub-pixel electrodes are respectively disposed on the passivation layer and the upper electrode in the first sub-pixel region and the second sub-pixel region. The sub-pixel electrodes are electrically connected to the upper electrode.

In accordance with the foregoing and other aspects of the present invention, an array substrate of a LCD is provided. The array substrate comprises a first substrate, a lower electrode, a dielectric layer, an upper electrode, a passivation layer and two sub-pixel electrodes. The first substrate comprises a first sub-pixel region and a second sub-pixel region. A portion of the lower electrode is disposed in the first sub-pixel region, and the other portion of the lower electrode is disposed in the second sub-pixel region. The dielectric layer is disposed on the lower electrode and the first substrate. The thickness of the dielectric layer in the first sub-pixel region is different from the thickness of the dielectric layer in the second sub-pixel region. The upper electrode is disposed on the dielectric layer above the lower electrode. The passivation layer is disposed on the upper electrode and the dielectric layer. The passivation layer has an opening to expose the upper surface of the upper electrode. Two sub-pixel electrodes are respectively disposed on the passivation layer and the upper electrode in the first sub-pixel region and the second sub-pixel region. The sub-pixel electrodes are electrically connected to the upper electrode.

In accordance with the foregoing and other aspects of the present invention, a panel of a LCD is provided. The panel comprises a plurality of pixels. Each pixel comprises an array substrate, a liquid crystal layer, a common electrode, an organic layer and a second substrate. The array substrate comprises a first sub-pixel region and a second sub-pixel region. The liquid crystal layer is disposed on the array substrate. The common electrode is disposed on the liquid crystal layer. The organic layer is disposed on the common electrode. The thickness of the organic layer in the first sub-pixel region is different from the thickness of the organic layer in the second sub-pixel region. The second substrate is disposed on the organic layer.

In the foregoing, the invention utilizes simple structural adjustment of the array substrate and the panel to reduce the problems of color shift and contrast decrease when viewed at high angles. Therefore, the LCD can provide uniform gray scale and wider viewing angle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

In embodiments, each pixel is further divided into two sub-pixels. By adjusting structures of the two sub-pixels, the two sub-pixels can have different total capacitance values. Because the different total capacitance values of the two sub-pixels affect the voltages exerted on the two sub-pixels are also different. As such, the liquid crystal molecules in the two sub-pixels are subjected to different voltages and thus oriented in different orientation directions. Therefore, the problems of color shift and contrast decrease when viewed at different angles can be reduced. Moreover, the LCD can provide the uniform gray scale and the wide viewing angle.

The following are three embodiments to illustrate the concept of the invention about how to make two sub-pixels have different total capacitance values by structural adjustment.

Embodiment 1

Figure 1:
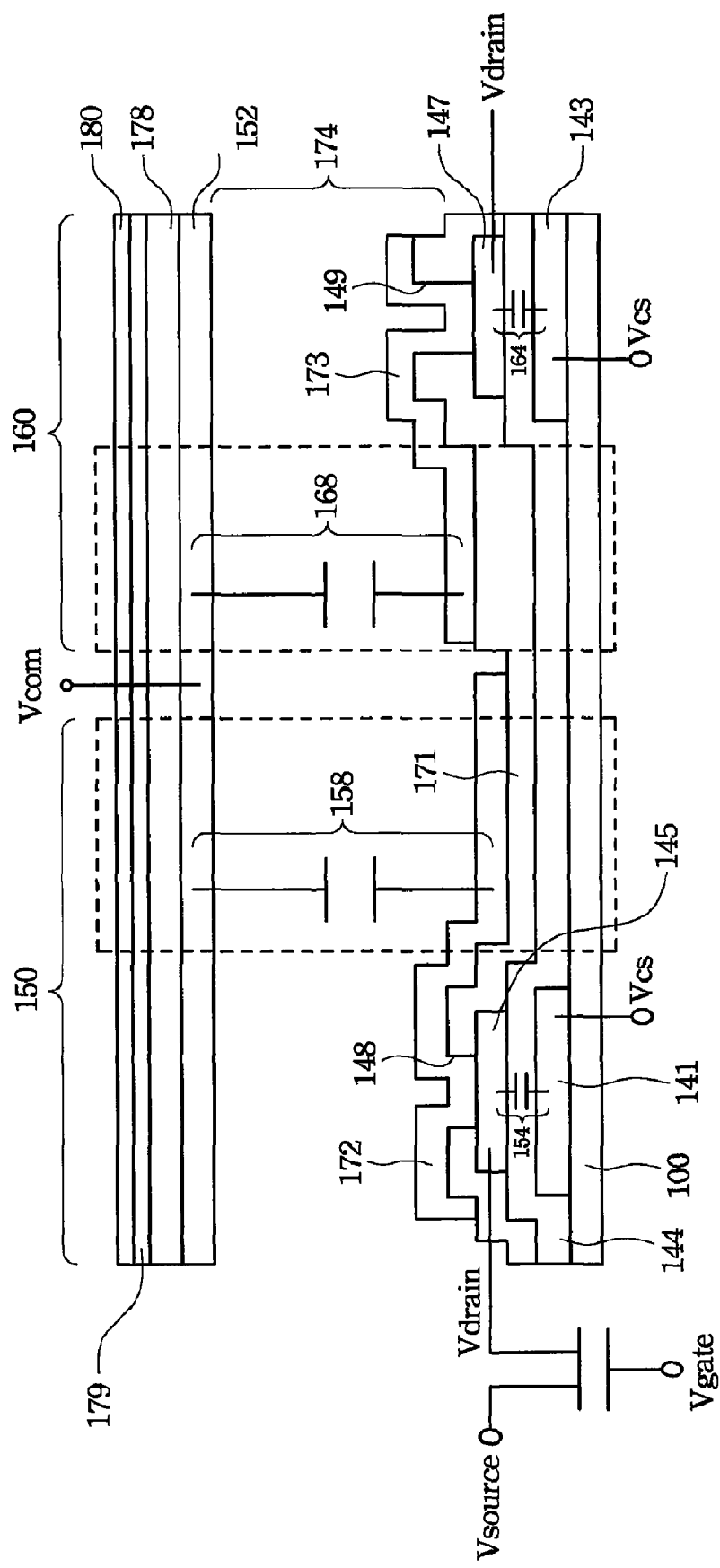
FIG. 1 is a cross-sectional view of a single pixel of a LCD panel according to embodiment 1 of the invention.

FIG. 1 is a cross-sectional view of a pixel of a LCD panel according to the embodiment 1 of the invention. In FIG. 1, the pixel region is further divided into two sub-pixel regions. The left side of the cross-sectional view of FIG. 1 is a first sub-pixel region 150, and the right side of the cross-section view is a second sub-pixel region 160. The area of the first sub-pixel region 150 can be unequal to the area of the second sub-pixel region 160. Base on the required viewing angle effect, the areas of the first sub-pixel region 150 and the second sub-pixel region 160 can be adjusted. A lower electrode is disposed over the first substrate 100 cross the first sub-pixel region 150 and the second sub-pixel region 160. To avoid confusion, a portion of the lower electrode in the first sub-pixel region 150 is called the first lower electrode 141, and the other portion of the lower electrode in the second sub-pixel region 160 is called the second lower electrode 143. A dielectric layer 144 is disposed on the first lower electrode 141, the second lower electrode 143 and the first substrate 100. For the same reason as the lower electrode stated above, an upper electrode is also divided into a first upper electrode 145 in the first sub-pixel region 150 and a second upper electrode 147 in the second sub-pixel region 160. The first upper electrode 145 and the second upper electrode 147 are respectively disposed on the dielectric layer 144 above the first lower electrode 141 and the second lower electrode 143. In the first sub-pixel region 150, the first lower electrode 141, the dielectric layer 144 and the first upper electrode 145 constitute a first storage capacitor 154. In the second sub-pixel region 160, the second lower electrode 143, the dielectric layer 144 and the second upper electrode 147 constitute a second storage capacitor 164.

A passivation layer 171 is disposed on the dielectric layer 144, the first upper electrode 145 and the second upper electrode 147. The passivation layer has a first opening 148 and a second opening 149 to respectively expose the upper surfaces of the first upper electrode 145 and the second upper electrode 147. The thickness of the passivation layer 171 in the first sub-pixel region 150 is different from the thickness of the passivation layer 171 in the second sub-pixel region 160.

The first sub-pixel electrode 172 and the second sub-pixel electrode 173 are disposed on the passivation layer 171, the first upper electrode 145 and the second upper electrode 147 and directly connect to the first upper electrode 145 and the second upper electrode 147 through the first opening 148 and the second opening 149, respectively. A liquid crystal layer 174, a common electrode 152, an organic layer 178, a color filter layer 179 and a second substrate 180 are sequentially disposed on the first sub-pixel electrode 172 and the second sub-pixel electrode 173. Among these layers, the color filter layer 179 comprises a black matrix. The position sequence of the organic layer 178 and the color filter layer 179 can be altered.

The first sub-pixel electrode 172, the liquid crystal layer 174 and the common electrode 152 constitute a first pixel capacitor 158. The second sub-pixel electrode 173, the liquid crystal layer 174 and the common electrode 152 constitute a second pixel capacitor 168.

In the embodiment 1, a material of the dielectric layer 144 is preferably silicon nitride or silicon oxide. A material of the passivation layer 171 is preferably silicon nitride or silicon oxide. Moreover, the passivation layer 171 can be an organic insulating layer. In FIG. 1, $V_{gate}$, $V_{source}$ and $V_{drain}$ are the voltages applied to the gate electrode, the source electrode and the drain electrode of the thin film transistor of the array substrate, respectively. $V_{com}$ is the voltage applied to the common electrode 152. $V_{cs}$ is the voltage applied to both the first lower electrode 141 and the second lower electrode 143. $V_{com}$ can be equal or unequal to the $V_{cs}$.

In the structures of the LCD panel, the total capacitance value of the first sub-pixel is the sum of the capacitance values of the first storage capacitor 154, the first pixel capacitor 158 and any other capacitor coupled thereto. The total capacitance value of the second sub-pixel is the sum of the capacitance values of the second storage capacitor 164, the second pixel capacitor 168 and any other capacitor coupled thereto. Because the first storage capacitor 154 and the second storage capacitor 164 are the same-storage capacitor, they have the same capacitance value. In embodiment 1, the capacitance value of the first pixel capacitor 158 is different from that of the second pixel capacitor 168, so that the total capacitance values of the first sub-pixel and the second sub-pixel are unequal. Specifically, the thickness of the passivation layer 171 in the first sub-pixel region 150 is different from the thickness of the passivation layer 171 in the second sub-pixel region 160. This renders the thickness of the liquid crystal layer 174 in the first pixel capacitor 158 to be different from the thickness of the liquid crystal layer 174 in the second pixel capacitor 168. Consequently, the capacitance value of the first pixel capacitor 158 is unequal to the capacitance value of the second pixel capacitor 168, and the goal of providing different total capacitance values for the first sub-pixel and the second sub-pixel is achieved.

Embodiment 2

Figure 2:
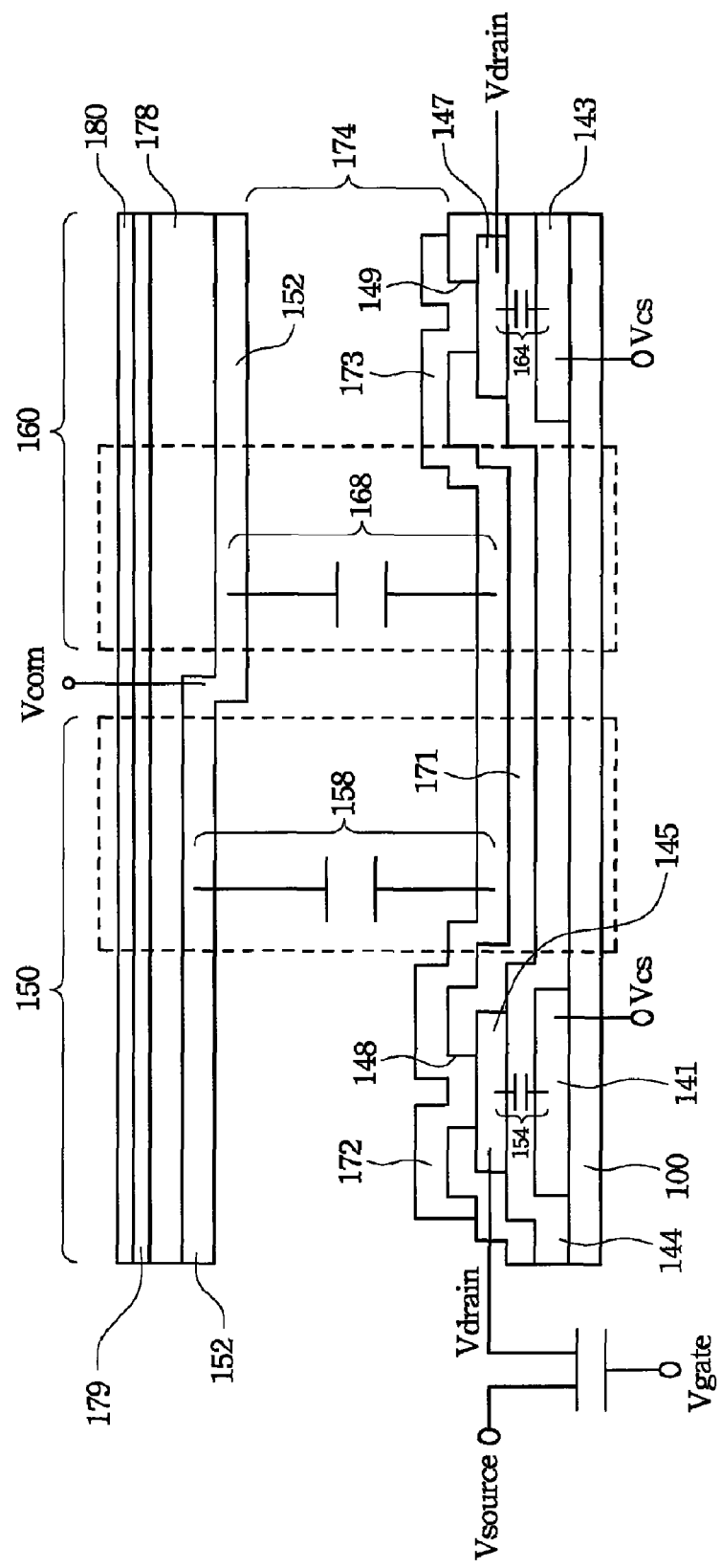
FIG. 2 is a cross-sectional view of a single pixel of a LCD panel according to embodiment 2 of the invention.

The major difference between embodiment 1 and embodiment 2 may be best shown by their cross-sectional structures. FIG. 2 is a cross-sectional view of a single pixel of a LCD panel according to the embodiment 2 of the invention. In FIG. 2, the element structures identical to those described in the embodiment 1 can be directly referred to the description of the embodiment 1 and are not repeated in this embodiment. The description of the embodiment 2 focuses on the difference between the embodiment 2 and the embodiment 1. In the embodiment 1, the different capacitance values of the pixel capacitors of the different sub-pixels are achieved by adjusting the thickness of the passivation layer in the sub-pixels to modify the thickness of the liquid crystal layer in the pixel capacitors of the sub-pixels. In the embodiment 2, the thicknesses of the passivation layer in the sub-pixels are the same. The embodiment 2 adjusts the thickness of the organic layer in the sub-pixels rather than adjusts the thickness of the passivation layer. In this way, the thicknesses of the liquid crystal layer in the pixel capacitors of the sub-pixels are different and hence the pixel capacitors of the two sub-pixels may have different capacitance values.

As shown in FIG. 2, the thickness of the passivation layer 171 in the first pixel region 150 is the same as the thickness of the passivation layer 171 in the second pixel region 160. The characteristic structure of the embodiment 2 is the thickness of an organic layer 178. The organic layer 178 is interposed between the common electrode 152 and the second substrate 180. In FIG. 2, the thickness of the organic layer 178 in the first sub-pixel region 150 is different from the thickness of the organic layer 178 in the second sub-pixel region 160. As a result, the thickness of the liquid crystal layer 174 of the first pixel capacitor 158 is different from the thickness of the liquid crystal layer 174 of the second pixel capacitor 168. Consequently, the capacitance value of the first pixel capacitor 158 is different from the capacitance value of the second pixel capacitor 168, and hence the total capacitance value of the first sub-pixel is different from the total capacitance value of the second sub-pixel.

Moreover, to achieve a wider viewing angle, the position sequence of the organic layer 178 and the color filter layer 179 can be swapped and is not limited to the position sequence shown in FIG. 2.

Embodiment 3

Figure 3:
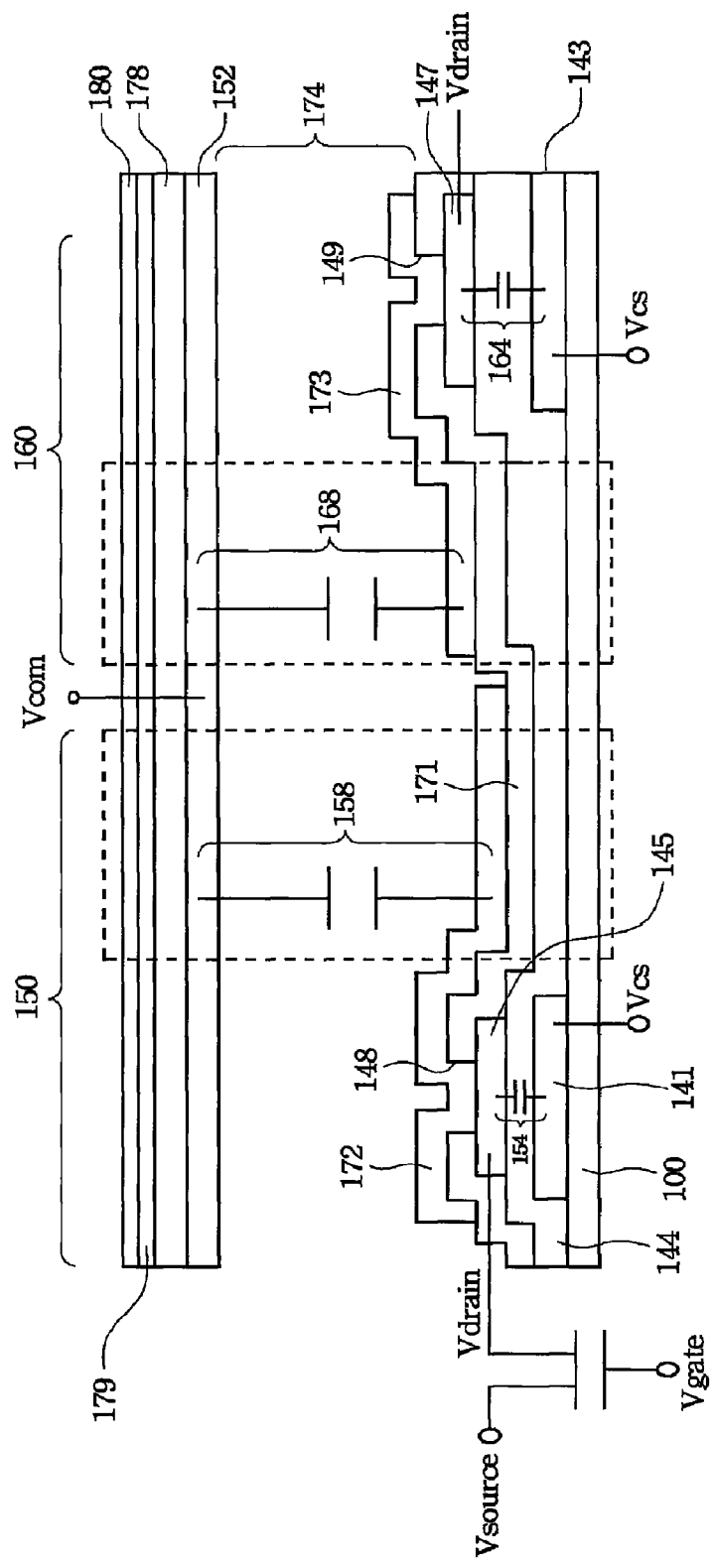
FIG. 3 is a cross-sectional view of a single pixel of a LCD panel according to embodiment 3 of the invention.

FIG. 3 is a cross-sectional view of a single pixel of a LCD panel according to the embodiment 3 of the invention. In FIG. 3, the element structures identical to those described in the embodiment 1 can be directly referred to the description of the embodiment 1 and are not repeated here. The total capacitance value of the pixel is the sum of the capacitance values of the storage capacitor, the pixel capacitor and other coupling capacitor. In the embodiment 1 and the embodiment 2, two sub-pixels having different total capacitance values are provided by changing the capacitance values of the pixel capacitors of the sub-pixels. Embodiment 3 however provides two sub-pixels having different total capacitance values by a different approach—changing the capacitance values of the storage capacitors of the sub-pixels.

Therefore, in this embodiment, the thickness of the passivation layer 171 in the first sub-pixel region 150 is identical to the thickness of the passivation layer 171 in the second sub-pixel region 160. The characteristic structure of the embodiment 3 is the thickness of the dielectric layer 144. The thickness of the dielectric layer 144 in the first sub-pixel region 150 is different from the thickness of the dielectric layer 144 in the second sub-pixel region 160. Because of the difference in the thicknesses, the capacitance value of the first storage capacitor 154 is different from the capacitance value of the second storage capacitor 164. Moreover, since the thicknesses of the dielectric layer 144 in the two sub-pixel regions are different, the thickness of the liquid crystal layer 174 in the first pixel capacitor 158 is different from the thickness of the liquid crystal layer 174 in the second pixel capacitor 168. Therefore, the capacitance value of the first pixel capacitor 158 is also different from the capacitance value of the second pixel capacitor 168. Because both the storage capacitance value and the pixel capacitance value in the first pixel are different from those in the second pixel, the total capacitance value of the first sub-pixel is different from the total capacitance value of the second sub-pixel.

Compared Comparing with the embodiment 1, the embodiment 3 provides an LCD with a wider viewing angle. In other embodiments, it is feasible to adjust only the thicknesses of the dielectric layer 144 in the first storage capacitor 154 and the second storage capacitor 164. In this way, the capacitance values of the storage capacitors in the two sub-pixels are different while the capacitance values of the pixel capacitors in the sub-pixels remain the same. As such, the total capacitances of the first sub-pixel and the second sub-pixel are different.

Accordingly, the present invention has the following advantages:

(1) The invention utilizes simple structural adjustment to increase the viewing angle of the LCD.

(2) The invention reduces the problems of color shift and color contrast decrease when being viewed at high angles.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the appending claims and their equivalents.

What is claimed is:

1. An array substrate of a LCD, wherein a liquid crystal layer is disposed thereon, the array substrate comprising:
    a substrate, comprising a first sub-pixel region and a second sub-pixel region;
    a lower electrode disposed on the substrate, wherein a portion of the lower electrode is disposed in the first sub-pixel region, and the other portion of the lower electrode is disposed in the second sub-pixel region;
    a dielectric layer disposed on the lower electrode and the substrate;
    an upper electrode disposed on the dielectric layer above the lower electrode;
    a passivation layer disposed on the upper electrode and the dielectric layer, wherein the passivation layer has an opening to expose the upper surface of the upper electrode, and the thickness of the passivation layer in the first sub-pixel region is different from the thickness of the passivation layer in the second sub-pixel region so that the thickness of the liquid crystal layer disposed above the first sub-pixel region is different from the thickness of the liquid crystal layer disposed above the second sub-pixel region; and
    a first sub-pixel and a second sub-pixel electrode respectively disposed on the passivation layer and the upper electrode in the first sub-pixel region and the second sub-pixel region, wherein the first sub-pixel and the second sub-pixel electrodes are electrically connected to the upper electrode.

2. The array substrate of claim 1, wherein the area of the first sub-pixel region is equal to the area of the second sub-pixel region.

3. The array substrate of claim 1, wherein the area of the first sub-pixel region is unequal to the area of the second sub-pixel region.

4. The array substrate of claim 1, wherein the material of the dielectric layer is silicon nitride or silicon oxide.

5. The array substrate of claim 1, wherein the material of the passivation layer is silicon nitride or silicon oxide.

6. The array substrate of claim 1, wherein the passivation layer is an organic insulating layer.

7. An array substrate of a LCD, wherein a liquid crystal layer is disposed thereon, the array substrate comprising:
    a substrate, comprising a first sub-pixel region and a second sub-pixel region;
    a lower electrode disposed on the substrate, wherein a portion of the lower electrode is disposed in the first sub-pixel region, and the other portion of the lower electrode is disposed in the second sub-pixel region;
    a dielectric layer disposed on the lower electrode and the substrate, wherein the thickness of the dielectric layer in the first sub-pixel region is different from the thickness of the dielectric layer in the second sub-pixel region so that the thickness of the liquid crystal layer disposed above the first sub-pixel region is different from the thickness of the liquid crystal layer disposed above the second sub-pixel region;

an upper electrode disposed on the dielectric layer above the lower electrode;

a passivation layer disposed on the upper electrode and the dielectric layer, wherein the passivation layer has an opening to expose the upper surface of the upper electrode;

a first sub-pixel and a second sub-pixel electrodes respectively disposed on the passivation layer and the upper electrode in the first sub-pixel region and the second sub-pixel region, wherein the first sub-pixel and the second sub-pixel electrodes are electrically connected to the upper electrode.

8. The array substrate of claim 7, wherein the area of the first sub-pixel region is equal to the area of the second sub-pixel region.

9. The array substrate of claim 7, wherein the area of the first sub-pixel region is unequal to the area of the second sub-pixel region.

10. The array substrate of claim 7, wherein the material of the dielectric layer is silicon nitride or silicon oxide.

11. The array substrate of claim 7, wherein the material of the passivation layer is silicon nitride or silicon oxide.

12. The array substrate of claim 7, wherein the passivation layer is an organic insulating layer.

13. A panel of a LCD, comprising:

a first substrate comprising a plurality of pixels, wherein each of the pixels comprises a first sub-pixel region and a second sub-pixel region;

a lower electrode disposed on the first substrate, wherein a portion of the lower electrode is disposed in the first sub-pixel region, and the other portion of the lower electrode is disposed in the second sub-pixel region;

a dielectric layer disposed on the lower electrode and the substrate;

an upper electrode disposed on the dielectric layer above the lower electrode;

a passivation layer disposed on the upper electrode and the dielectric layer, wherein the passivation layer has an opening to expose the upper surface of the upper electrode, and the thickness of the passivation layer in the first sub-pixel region is different from the thickness of the passivation layer in the second sub-pixel region;

a first sub-pixel electrode and a second sub-pixel electrode respectively disposed on the passivation layer and the upper electrode in the first sub-pixel region and the second sub-pixel region, wherein the first sub-pixel electrode and the second sub-pixel electrode are electrically connected to the upper electrode;

a second substrate facing the first substrate;

a liquid crystal layer disposed on the sub-pixel electrodes and between the first substrate and the second substrate, wherein the liquid crystal layer comprises a first liquid crystal layer disposed above the first sub-pixel region and a second liquid crystal layer disposed above the second sub-pixel region; and a common electrode disposed between the second substrate and the liquid crystal layer, wherein the first sub-pixel electrode, the first liquid crystal layer and the common electrode constitute a first pixel capacitor, and the second sub-pixel electrode, the second liquid crystal layer and the common electrode constitute a second pixel capacitor, and wherein the thicknesses of the first and the second liquid crystal layers are different so that the capacitance value of first pixel capacitor is unequal to the capacitance value of the second pixel capacitor.

14. A panel of a LCD, comprising:

a first substrate comprising a plurality of pixels, wherein each of the pixels comprises a first sub-pixel region and a second sub-pixel region;

a lower electrode disposed on the first substrate, wherein a portion of the lower electrode is disposed in the first sub-pixel region, and the other portion of the lower electrode is disposed in the second sub-pixel region;

a dielectric layer disposed on the lower electrode and the substrate, wherein the thickness of the dielectric layer in the first sub-pixel region is different from the thickness of the dielectric layer in the second sub-pixel region;

an upper electrode disposed on the dielectric layer above the lower electrode;

a passivation layer disposed on the upper electrode and the dielectric layer, wherein the passivation layer has an opening to expose the upper surface of the upper electrode;

a first sub-pixel and a second sub-pixel electrode respectively disposed on the passivation layer and the upper electrode in the first sub-pixel region and the second sub-pixel region, wherein the first sub-pixel and the second sub-pixel electrode are electrically connected to the upper electrode;

a second substrate facing the first substrate;

a liquid crystal layer disposed on the sub-pixel electrodes and between the first substrate and the second substrate, wherein the liquid crystal layer comprises a first liquid crystal layer disposed above the first sub-pixel region and a second liquid crystal layer disposed above the second sub-pixel region; and a common electrode disposed between the second substrate and the liquid crystal layer, wherein the first sub-pixel electrode, the first liquid crystal layer and the common electrode constitute a first pixel capacitor, and the second sub-pixel electrode, the second liquid crystal layer and the common electrode constitute a second pixel capacitor, and wherein the thicknesses of the first and the second liquid crystal layers are different so that the capacitance value of first pixel capacitor is unequal to the capacitance value of the second pixel capacitor.

* * * * *